(No Model.)
J. E. SIMPSON.
FERTILIZER DISTRIBUTER.
No. 316,071. Patented Apr. 21, 1885.
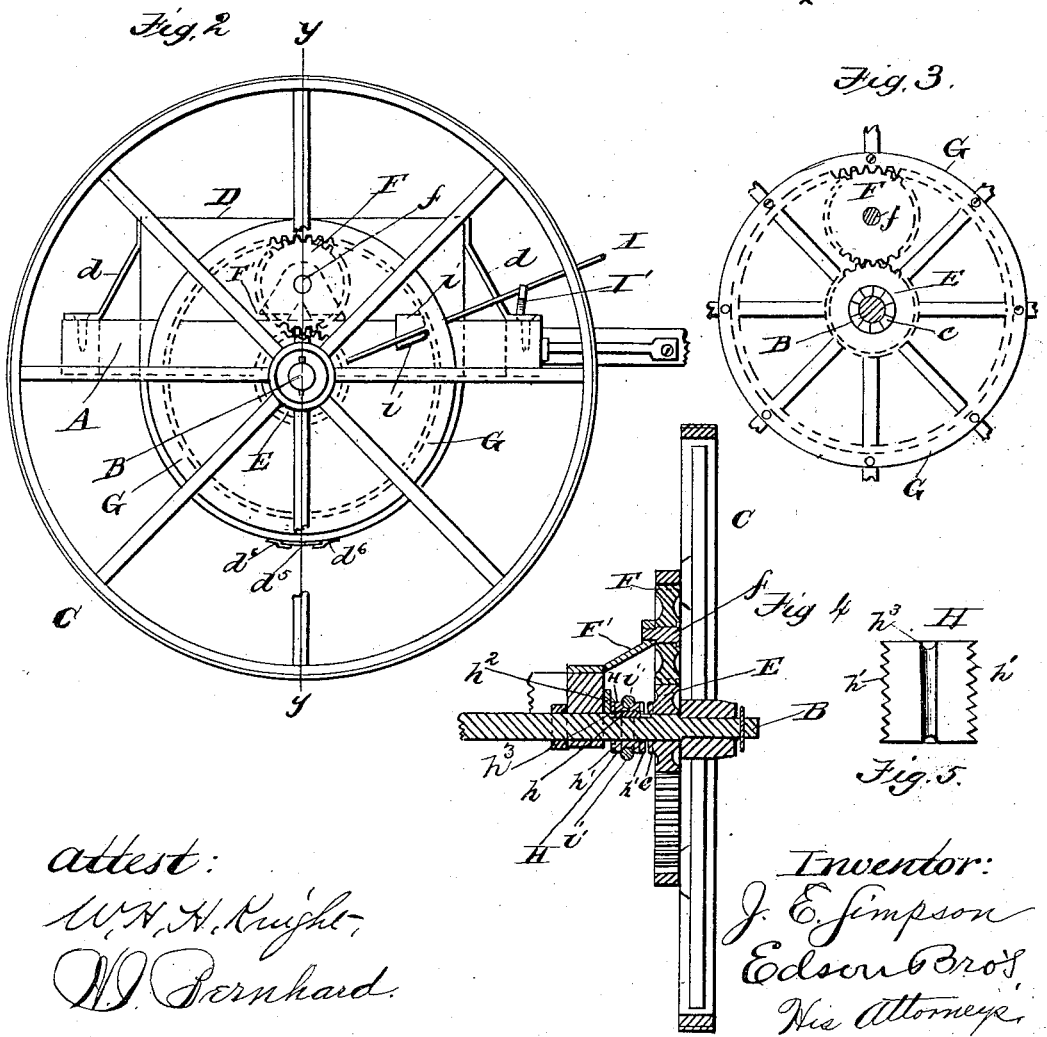

UNITED STATES PATENT OFFICE.

JOEL E. SIMPSON, OF NEWARK, NEW YORK.

FERTILIZER-DISTRIBUTER.

SPECIFICATION forming part of Letters Patent No. 316,071, dated April 21, 1885.

Application filed March 27, 1884. (No model.)

*To all whom it may concern:*

Be it known that I, JOEL E. SIMPSON, a citizen of the United States, residing at Newark, in the county of Wayne and State of New York, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fertilizer-distributers, and has for its object the provision of an implement of the class named wherein the use of supplemental shafts for operating the scrapers is avoided, said scrapers being connected to the main supporting-axle and operated thereby.

It further has for its object the provision of means whereby the main axle and its attached scrapers may be rotated or held stationary, as desired, while the implement is moving in a forward direction.

To the accomplishment of the above my invention consists in the construction, arrangement, and combination of parts, substantially as hereinafter described, and more fully pointed out in the claims.

In the drawings, Figure 1 is a top plan view of a fertilizer-distributer provided with my improvements. Fig. 2 is an enlarged end elevation of Fig. 1. Fig. 3 is a section on the line $x\ x$ of Fig. 1. Fig. 4 is a sectional view taken on the line $y\ y$ of Fig. 2. Fig. 5 is a detached view of the clutch H.

Like letters of reference in the several drawings denote like parts.

Referring to the drawings, A designates the frame, preferably made of wood, and provided with a draft-tongue, A'.

B designates a shaft extending from side of the frame, forming bearings for the driving-wheels C C' at each side of the frame A.

$b$ designates collars placed upon the shaft B within the sides of the frame, to prevent its lateral displacement upon the shaft.

D designates a box, wherein the material to be distributed is placed, and which is secured to the frame A by braces or straps $d$. The shaft B passes through the box from end to end thereof, and is provided within the box with sleeves $d'$, having arms $d^2$, to the outer ends of which scraper-blades $d^3$ are attached. The bottom of the box D is curved in a line concentric with the shaft, and is provided along its middle with apertures $d^4$, that register with apertures in a slide, $d^5$, that is held by and moves in guides $d^6$, secured to the outside of the bottom of the box.

E designates a gear-pinion loosely mounted upon one end of the shaft B, inside of and bearing against the hub of the driving-wheel C.

F designates an intermediate gear-wheel mounted upon a stud, $f$, projecting from a bracket, F', secured to the upper surface of the frame A. The teeth of the gear-wheel engage with the pinion E, and also with the teeth upon an internal geared rim, G, secured upon the inner side of the driving-wheel C.

H designates a sliding clutch, keyed at $h$ to and sliding upon the shaft B, between the pinion E and the side of the frame. The clutch H is provided at each end with clutch-teeth $h'$, that engage, when desired, with clutch-teeth $e$ of the pinion E and similar teeth of a plate, $h^2$, secured to the side of the frame A. The clutch H is surrounded by a groove, $h^3$.

I designates a lever fulcrumed to a support, $i$, projecting from the frame, the lower end of the lever being bifurcated and made to embrace the clutch H, as shown at $i'$.

I' designates a plate secured to the frame, and provided upon its upper surface with notches $i^2$, whereby the clutch H can be held into engagement with the pinion E or plate $h^2$ on the frame.

The operation of my improvement is as follows: The box being filled with material to be distributed, and the apertures $d^4$ at the bottom thereof adjusted to proper size, the clutch H is thrown into engagement with the gear-wheel E, whereby, when the machine is moved forward, the shaft will be caused to revolve through the gear-pinion F and gear-rim G, causing the scraper-blades $d^3$ to move through the material in the box, and thereby force the material through the apertures in the bottom thereof.

When desired, the shaft B may be held stationary by moving the clutch by the lever I into engagement with the plate $h^2$ upon the frame.

Any desired speed may be given to the shaft B by the substitution of pinions of different diameters in lieu of the pinions E and F, or by the use of a smaller pinion in lieu of the pinion F, having a large pinion secured upon its side within the rim G, said large pinion engaging with a pinion placed upon the shaft in lieu of the pinion E.

I am aware that various modifications may be made in the details of construction, and therefore I do not limit myself to the exact form herein shown and described, but would have it understood that I claim the right to make such modifications as fairly fall within the scope of my invention.

What I claim as my invention, and desire to secure by Letters Patent of the United States, is—

1. In a fertilizer-distributer, a frame having a box for the reception of material secured thereto, said frame and box mounted upon a shaft having scraper-blades attached thereto, and gear-pinion loosely mounted thereon, in combination with the bearing and driving wheels having gear-rim attached thereto, and intermediate gearing for rotating the shaft by the forward movement of the driving-wheel, substantially as described, and for the purpose set forth.

2. In a fertilizer-distributer, a frame provided with a box for the reception of the fertilizing material, said frame and box supported by an axle or shaft extending from side to side of the frame through said box, the axle having scraper-blades, a sliding clutch keyed thereto, and a gear-pinion having clutch-teeth mounted thereon, in combination with the bearing and supporting wheel having internal gear-rim attached thereto, and adapted to operate the loose pinion upon the shaft through an intermediate gear-pinion, whereby the axle or shaft is rotated by the forward movement of the driving-wheel, as and for the purpose set forth.

3. In a fertilizer-distributer, a frame provided with a box for holding the fertilizing material, mounted upon an axle or shaft and driving-wheels, and having a disk provided with clutch-teeth secured thereto, in combination with a sliding clutch keyed to said axle or shaft, and clutch-operating lever, whereby to hold the shaft against rotation when the machine is moved forward upon its supporting-wheels, substantially as described, and for the purpose set forth.

4. In a fertilizer-distributer, a single axle passing through the material-holding box, and provided within said box with scraper-arms and blades, in combination with bearing and driving wheels mounted upon the ends of said axle or shaft, and having suitable gear-wheels for the rotation of said axle or shaft, sliding clutch operated by a lever placed upon the shaft between the driving-wheel and frame, whereby to rotate or hold the shaft stationary, as and for the purpose described.

5. In a fertilizer-distributer, the combination of the following-named elements, to wit: a frame, A, having tongue A', fertilizer-holding box D, having apertures $d^4$, shaft or axle B, having clutch H, lever I, wheels C C', gear-pinions E F, and internal gear-rim G, constructed as described, and serving to rotate the shaft or axle backward while the driving-wheels move forward, as and for the purpose set forth.

6. In a fertilizer-distributer, the combination of the following-named elements, to wit: a frame, A, having tongue A', fertilizer-holding box D, having apertures $d^4$ for the discharge of the fertilizing material, shaft or axle B, mounted upon wheels C C', provided with internal gear-rim G and gear-pinions E F, clutch H, operated by lever I, toothed clutch-disk $h^2$, secured to the frame and serving to hold the shaft or axle from rotating when the driving-wheels are moved forward, as and for the purpose described.

In testimony whereof I affix my signature in presence of two witnesses.

JOEL E. SIMPSON.

Witnesses:
 WYMAN SIMPSON,
 RUFUS REED.